United States Patent [19]
Neal et al.

[11] Patent Number: 5,189,925
[45] Date of Patent: Mar. 2, 1993

[54] GEAR SHIFT LEVER

[75] Inventors: Leonard Neal, Windsor; Robert Elliott, Tecumseh, both of Canada

[73] Assignee: Tamco Limited, Ontario, Canada

[21] Appl. No.: 808,734

[22] Filed: Dec. 17, 1991

[51] Int. Cl.⁵ ............................................. B60K 20/00
[52] U.S. Cl. .................................. 74/473 R; 74/473 P; 403/225
[58] Field of Search .................. 74/523, 524, 543, 545, 74/557, 527, 531, 473 P; 81/177.1, 177.2, 489; 273/80.4 B; 403/225, 265, 270, 372

[56] References Cited

U.S. PATENT DOCUMENTS

| 4,569,246 | 2/1986 | Katayama et al. | 403/225 X |
| 4,603,598 | 8/1986 | Tsuji et al. | 403/225 X |
| 4,768,393 | 9/1988 | Beaman | 403/225 X |
| 5,000,611 | 3/1991 | Reinhart | 403/265 |

Primary Examiner—Leslie A. Braun
Assistant Examiner—Khoi Q. Ta
Attorney, Agent, or Firm—Hill, Steadman & Simpson

[57] ABSTRACT

A vehicle gearshift lever assembly is disclosed and includes an upper lever member for manipulation by the vehicle operator, an insert shaft for operative connection with the vehicle gearbox and an isolator member located in the lower end of the lever member and receiving the upper end of the insert shaft. The isolator member is formed of a resilient substance such as rubber so that vibration from the gearbox and the insert shaft are absorbed to a substantial degree by the isolator thereby to inhibit transfer of the vibration and noise from the gearbox to the upper lever member.

2 Claims, 3 Drawing Sheets

GEAR SHIFT LEVER

This invention relates to vehicle transmissions or gearboxes and in particular to a gearshift lever assembly adapted for operative engagement to a gearbox or transmission.

BACKGROUND OF THE INVENTION

In recent years, manually operated gearboxes have become popular due, in some part, to the emphasis on the use of smaller engines and increased fuel mileage. Additionally, the manually operated gearboxes and, to a great extent automatic gearboxes, are operated from central consoles located between the two front seats of an automobile, the operative mechanism including a gearshift lever assembly, the upper end of which is operable by the driver and which is connected directly or indirectly to the manual or automatic gearbox of the vehicle.

SUMMARY OF THE INVENTION

The present invention provides a gearshift lever assembly which incorporates a weight reduction compared to other assemblies currently in use. Additionally, due to the construction of the present invention the assembly has excellent sound and vibration absorption qualities due to the detailed configuration and material used in the members of the assembly. Moreover, the ease of manufacturing the present invention results in lower manufacturing costs which can be passed on to the consumer.

According to a broad aspect, the invention relates to a gearshift lever assembly comprising an insert shaft for operative engagement with the vehicle gearbox, an upper lever member for manipulation by an operator of the vehicle and operatively engaging the insert shaft; and an isolator member located in the lower end of the lever member and which receives the upper end of the insert shaft. The isolator member is formed of a resilient substance such that vibration from the gearbox and the insert shaft are absorbed to a substantial degree by the isolator member thereby to inhibit transfer of the vibration to the upper lever member.

BRIEF DESCRIPTION OF THE DRAWINGS

The invention is illustrated by way of example in the accompanying drawings in which.

DETAILED DESCRIPTION OF THE PREFERRED EMBODIMENT

Figure 1:
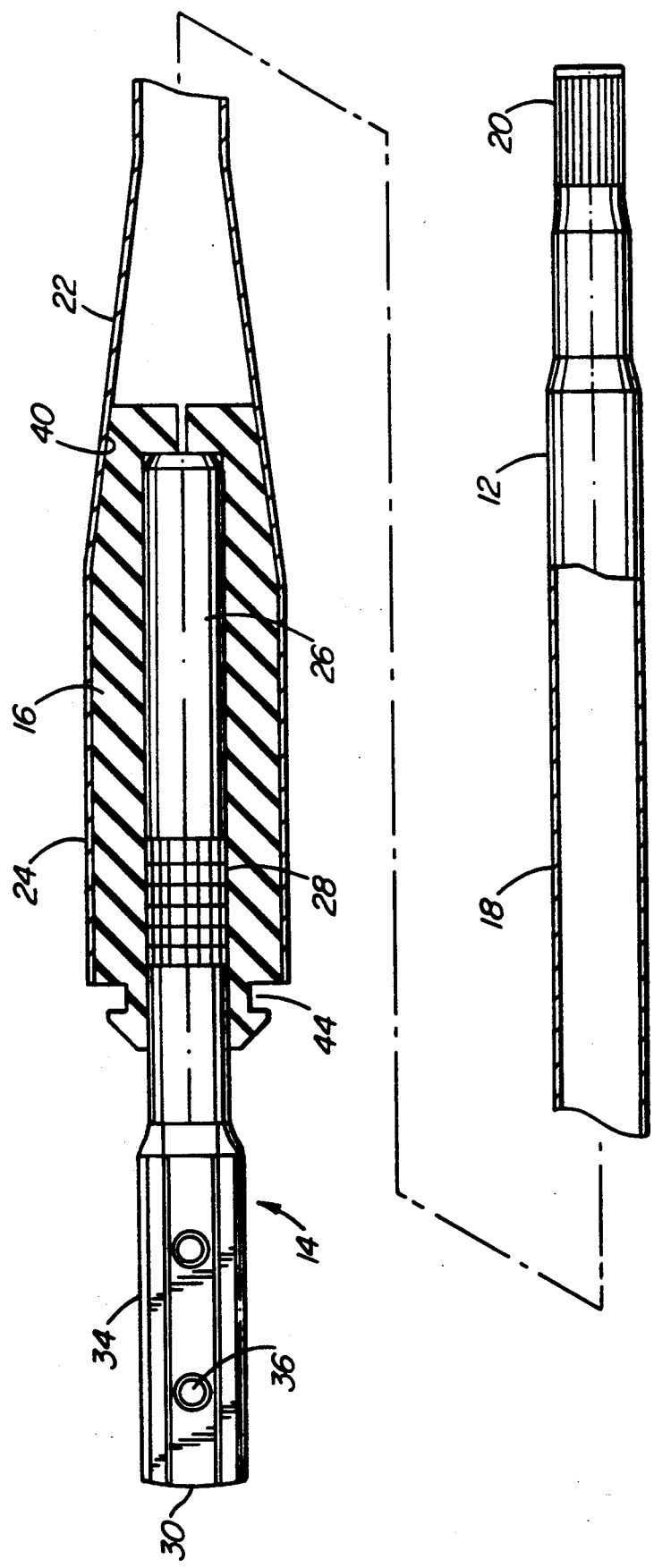
FIG. 1 is an elevation view, partly in section, of the completed lever assembly.

Referring initially to FIG. 1, the vehicle gearshift lever assembly 10 comprises three basic elements, the upper lever member 12, the insert shaft 14 and the isolator member 16 as illustrated, the lever member 12 has an elongated shaft portion 18 of tubular construction, the upper or small end thereof being knurled at 20 to receive a gearshift lever knob, handle or the like.

The other or lower end of the lever member flares outwardly in diameter at 22 towards an enlarged cylindrical end portion 24.

Figure 4:
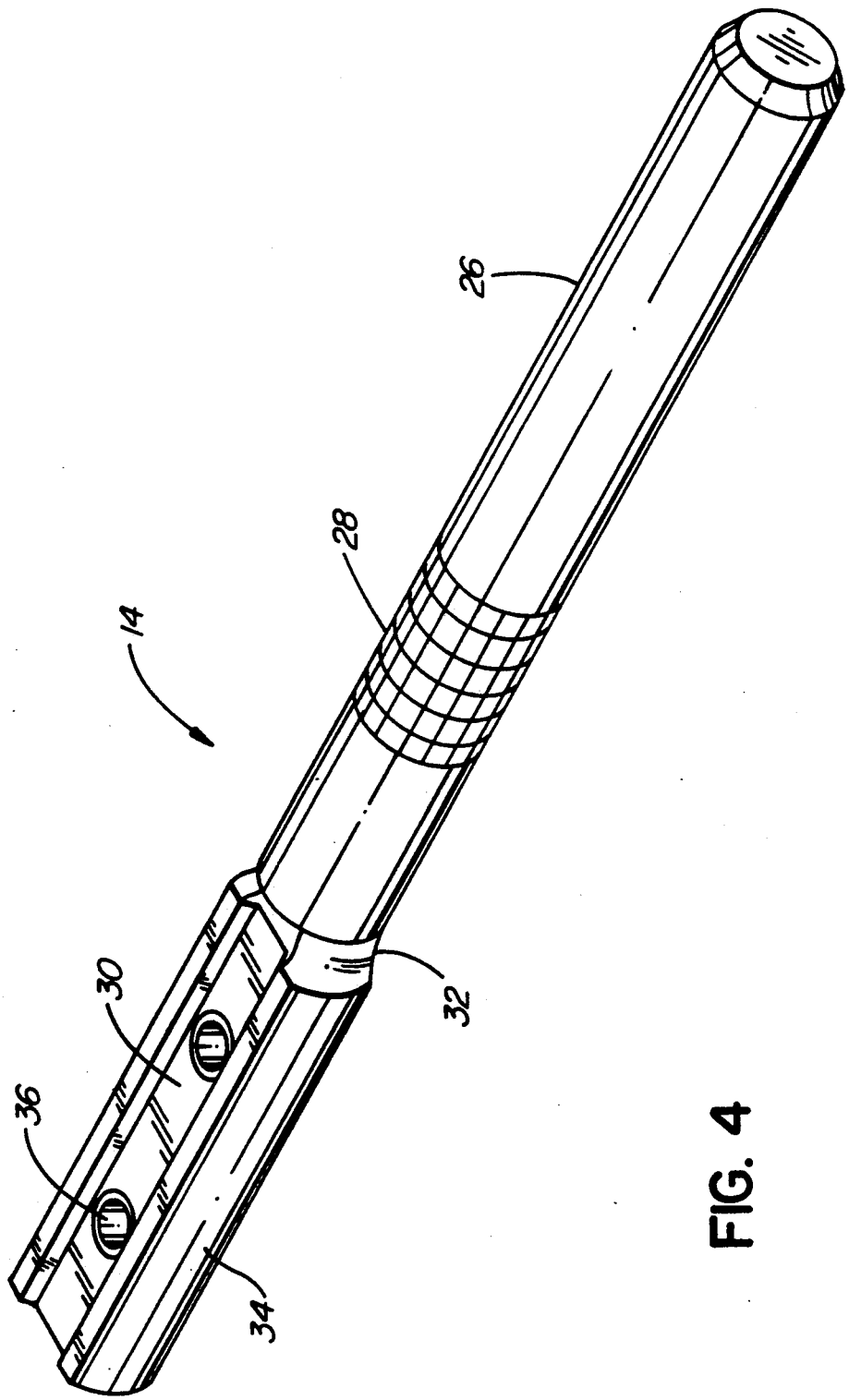
FIG. 4 is a perspective view of the insert shaft of the lever assembly.

The insert shaft 14 is shown in plan view in the illustration of FIG. 1 and in perspective view in FIG. 4. Insert shaft 14 has a first, elongated portion 26 of circular cross-section although other cross-sectional configurations would be quite effective. Portion 26 preferably has knurling 28 on at least a part of the surface thereof to increase frictional contact between the elongated portion 26 and the interior of the isolator member 16 and also to inhibit transfer of vibration between the two members. The second or lower portion of the insert shaft 14 is configured for connection to mechanism associated with the vehicle gearbox. Accordingly, the form of the connection illustrated here can be altered to suit connection with a specific make and model of vehicle. As illustrated however the lower end of insert shaft 14 includes a flat, concave central portion 30 and a parallel, flat lower surface 32 joined together by opposed, convex side walls 34. A pair of drilled apertures 36 are adapted for use in mounting the lower end of shaft 14 to the gearbox mechanism.

Figure 3:
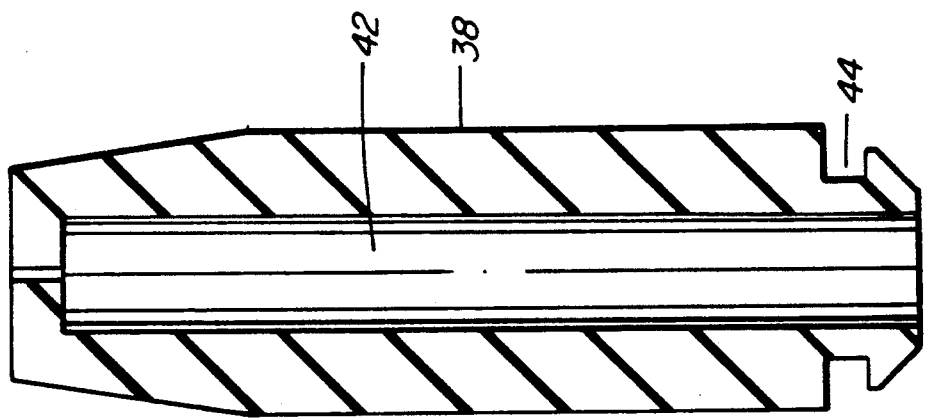
FIG. 3 is a cross-sectional view taken along the line 3—3 of FIG. 2.
Figure 2:
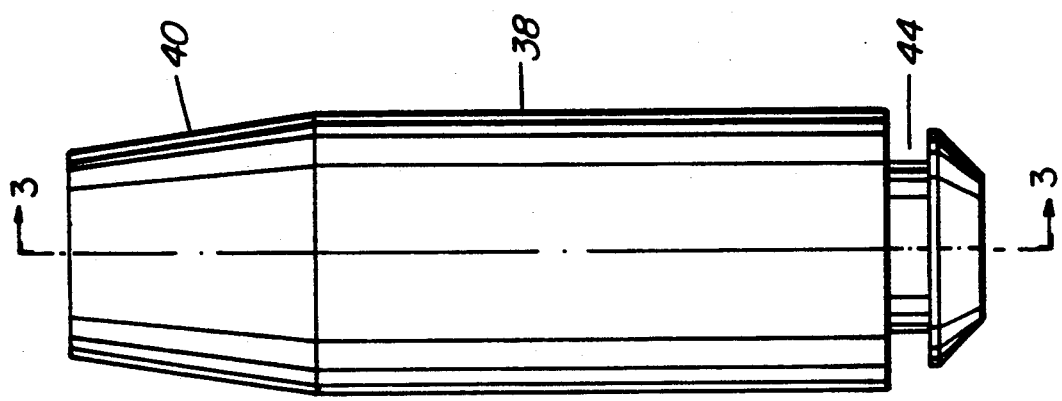
FIG. 2 is an elevation view of the isolator member of the assembly.

Referring to FIGS. 2, 3 and 4, the isolator member 16 is formed of resilient material, preferably rubber, and is located in the lower operative end of the upper lever assembly 12 and it envelopes the end of the insert shaft 26.

The isolator member 16 has a cylindrical outer surface 38 with a frusto-conical upper end 40 and a central, coaxial bore 42 therein. The lower end of the isolator member may be formed with a peripheral groove 44 for mounting to other, peripheral members of the assembly, not shown.

As seen in FIG. 4, the upper frusto-conical end 40 of the isolator member 16 engages the juxtaposed surfaces of the interior of the flared portion 22 of the upper lever assembly 18.

The upper end 26 of the shaft and the lower end 24 of the gearshift assembly are heat bonded to the isolator member 16 using, for example, CHEMLOK 252 ® at 335° F. for 30 minutes.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claims.

The embodiments of the invention in which an exclusive property or privilege is claimed are defined as follows:

1. A vehicle gearshift lever assembly comprising:
   a) an upper lever member for manipulation by a vehicle operator, said upper lever having a top end and a lower, operative end;
   b) an isolator member located in the lower end of said upper lever member, and
   c) an insert shaft for operative engagement with a vehicle gearbox mechanism;
   said isolator member being formed of an integrally formed piece of resilient material so that vibration from said gearbox and insert shaft is absorbed by said isolator to inhibit transfer of said vibration to said upper lever member; and comprising a cylindrical configuration with a frusto-conical upper end and engaging juxtaposed surfaces of the interior of said operative end of said upper lever member, and a central, coaxial bore in said isolator for receiving an upper portion of the insert shaft therein;

d) said isolator member having its lower end projecting outwardly of the upper lever member and having a peripheral groove therein;

e) said insert shaft having a lower end with means for connection to a vehicle gearbox and an upper end located in the coaxial bore of said isolator member, and knurling on at least a part of the surface of said upper end located in the isolator member; said upper end of said insert shaft having a constant diameter throughout its length.

2. A vehicle gearshift assembly according to claim 1 wherein a portion of the insert shaft is of a smooth circular cross-section adjacent the knurling.

* * * * *